C. A. AIKEN.
LANTERN HOLDER.
APPLICATION FILED JUNE 4, 1912.
1,057,698.
Patented Apr. 1, 1913.
3 SHEETS—SHEET 3.
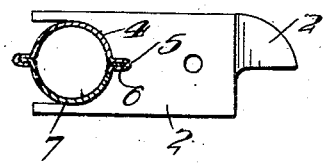
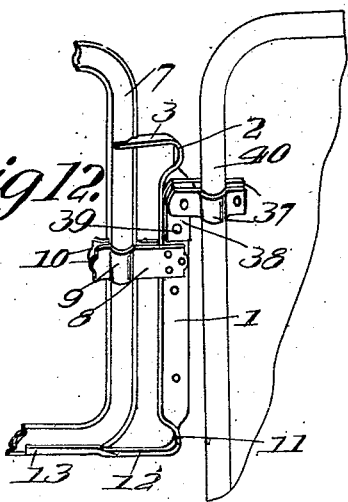
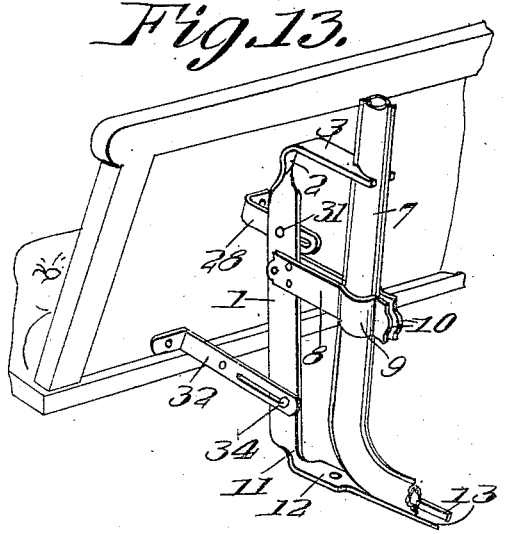
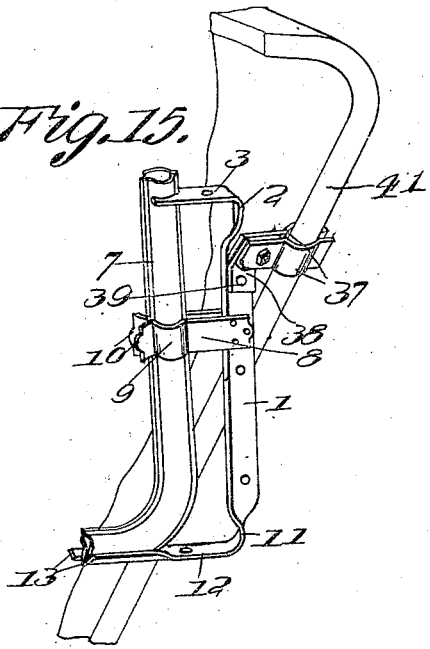
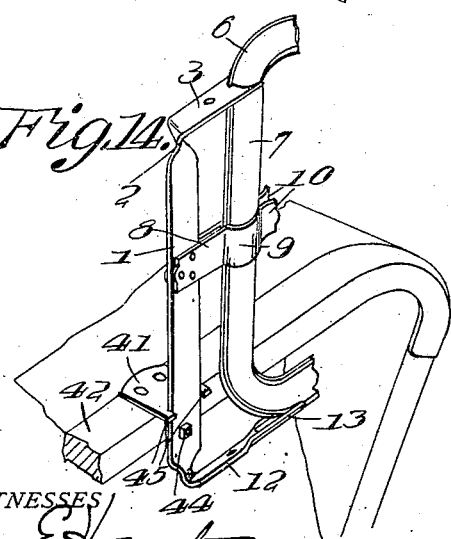
WITNESSES
Ada E. Hagerty
Elsa B. Dana
INVENTOR
Charles A. Aiken
by Joseph H. Milker
Attorney United States Patent Office.

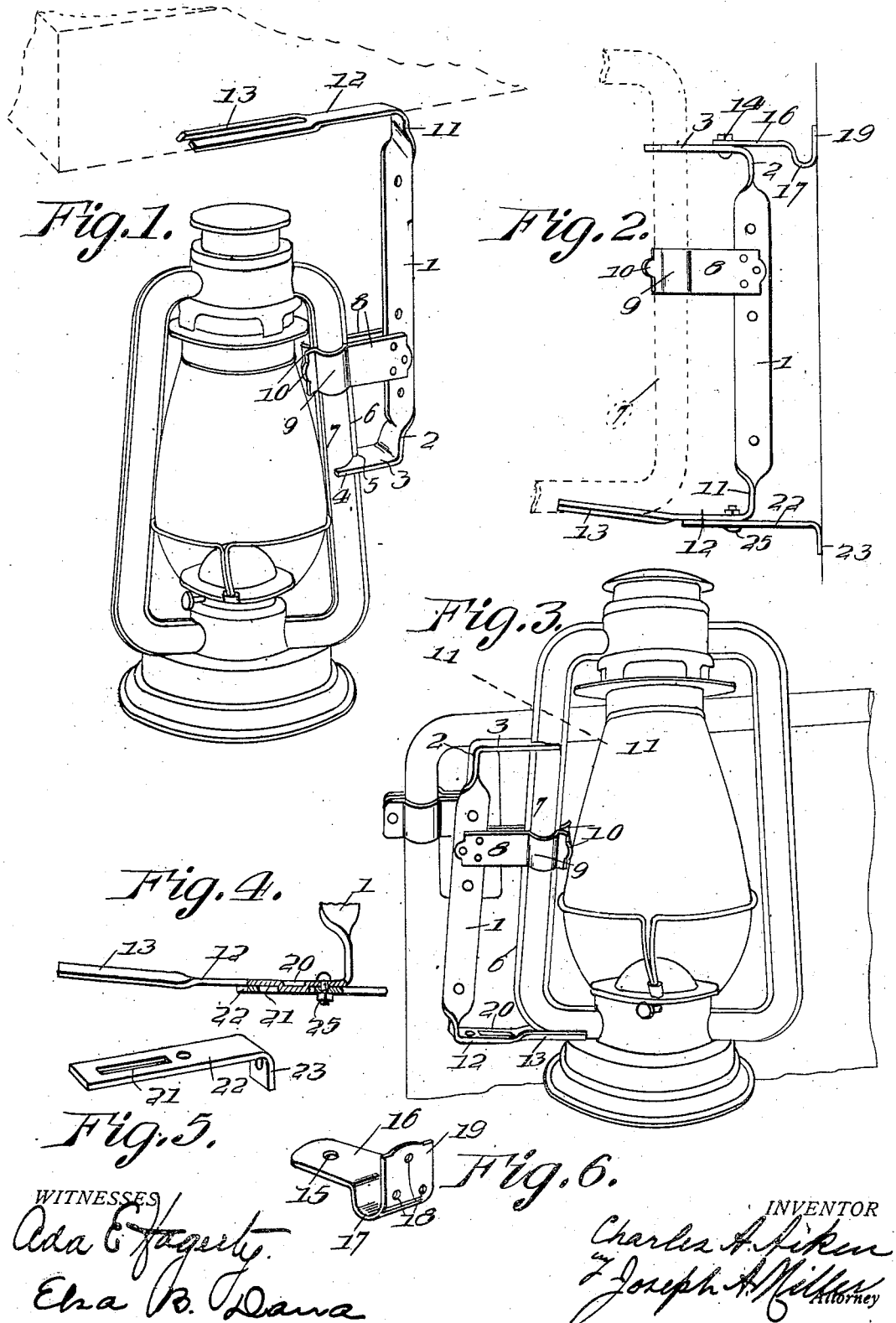

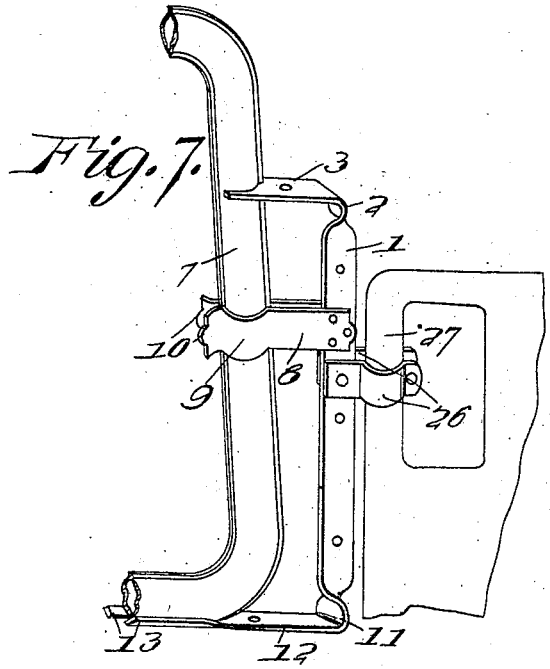
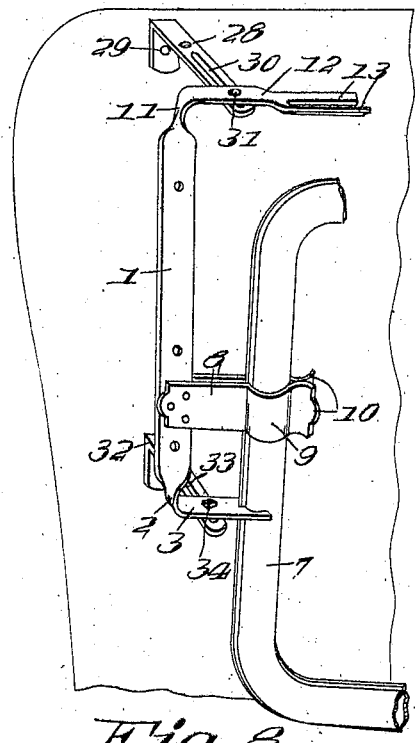
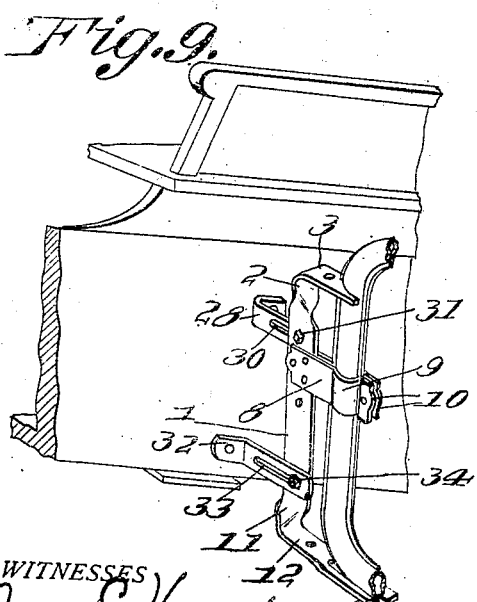
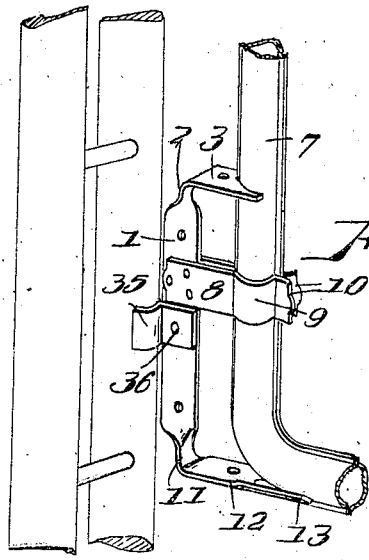

CHARLES AGUSTUS AIKEN, OF JAMAICA, VERMONT.

LANTERN-HOLDER.

1,057,698.  Specification of Letters Patent.  Patented Apr. 1, 1913.

Application filed June 4, 1912. Serial No. 701,502.

*To all whom it may concern:*

Be it known that I, CHARLES AGUSTUS AIKEN, a citizen of the United States, residing at Jamaica, in the county of Windham and State of Vermont, have invented a new and useful Improvement in Lantern-Holders, of which the following is a specification.

This invention relates to certain new and useful improvements in lantern holders, and pertains more particularly to holders of this type used in connection with vehicles, sleighs and the like, and also in connection with lamp-posts, ladders and various other articles.

The object of the invention is to provide a novel and improved holder for lanterns which will maintain same in a rigid position, and will permit the lantern to be secured in place, and removed quickly and easily.

In the drawings: Figure 1 is a perspective view of the invention having a lantern attached thereto, showing the manner in which the holder is attached to the under side of a vehicle body. Fig. 2 is a side elevation of a modified form of the invention, in which the holder is secured to one side of the vehicle body so as to be movable to a position in engagement with said side of the vehicle, when the lantern is detached from the holder. Fig. 3 is a perspective view of the invention applied to the dash-board of a vehicle or sleigh. Fig. 4 is a fragmentary side elevation, partly broken away and in section, showing the means for allowing swinging movement of the lantern holder shown in Fig. 2. Fig. 5 is a detail perspective view of the lower bracket shown in Fig. 2. Fig. 6 is a similar view of the upper bracket shown in Fig. 2. Fig. 7 is a view similar to Fig. 3 showing the lantern holder in a position to one side of and in alinement with the dash board. Fig. 8 is a perspective view of another modification showing the holder secured in front of the dash board. Fig. 9 is a perspective view of another modification showing the holder secured to the side of the vehicle body. Fig. 10 is a perspective view of the invention applied to a step ladder. Fig. 11 is a section on the line 11—11 of Fig. 3. Fig. 12 is a perspective view of another modified form of the invention showing the holder attached to the vehicle top on the outside of the top. Fig. 13 is a perspective view of another modification of the invention in which the lantern holder is attached to one end of the seat. Fig. 14 is a view similar to Fig. 12, showing the lantern holder attached to the vehicle top at the upper end of the latter. Fig. 15 is a view similar to Fig. 12, showing the holder attached to the side of the vehicle top on the interior of the top, and Fig. 16 is a perspective view of the clip used in connection with the form of the invention shown in Fig. 14.

The holder in each form of the invention consists of a vertical arm 1 formed of sheet metal having one end twisted at 2 and bent outwardly at right angles to provide a short horizontal arm 3, which is formed with a substantially semi-circular opening 4 (Fig. 11), and a contracted portion or slot 5, one side arm 7 of the lantern being received in opening 4 and having its seam 6 projecting into the slot 5, whereby the lantern arm 7 is given a firm and substantial support.

In all forms of the invention depicted a pair of spring clips or jaws are rigidly secured at their inner ends on opposite sides of the arms 1, and their outer ends are provided with concave portions 9 to receive and engage on opposite sides of the lantern arms 7 the extremities of said outer ends being inclined outwardly at 10 so as to be divergently related to enable the lantern arms 7 to be easily engaged with the spring jaws, the seams 6 of the lantern arms being received in the space between the spring jaws 8, which space is provided by virtue of the arm 1 which is interposed between the inner ends of the spring jaws.

In the form of the invention depicted in Fig. 1 of the drawings, arm 1 has its upper end twisted at 11 and turned outwardly to form a horizontal arm 12, which latter is bifurcated at 13 to receive in said bifurcation any suitable fastening means, such as bolts or screws to hold the arm in engagement with the under side of the bottom of the vehicle body shown in dotted lines.

In Figs. 2 to 6 inclusive, wherein the holder is attached to a side of the vehicle body, arm 3 is perforated to receive a bolt 14 that passes through a similar perforation 15 in a clip 16. Clip 16 is depressed at 17 and turned upwardly at 19 to form a vertical arm having screw holes 18 to receive screws, whereby the clip can be secured in position.

The forked arm 12 of the holder in this use of the invention is reversed so as to be at the lower end of the arm 1, and the forks are given a downward and inward inclination to provide a seat for the horizontal base end of lantern arm 7, the seam of the same being received in the space between the forks. Fig. 2 differs from Fig. 3 in that the horizontal arm 12 thereof is provided with a struck-out teat or projection 20 which projects downwardly into a slot 21 of the horizontal arm 22, the latter having an outturned end 23 which is secured to the side of the vehicle body. A bolt 25 pivotally connects arms 12 and 22, so that the arm 12 can be moved about said bolt as a pivot, the arms having spring properties which allow the teat 20 to be sprung out of the slot 21, to permit the arm 1 to be swung against the side of the vehicle body when not in use.

In Fig. 7 of the drawings the arm 1 has clamps 26 secured to its opposite sides, which clamps engage the part 27 of the dash board.

In Fig. 8 a bracket 28 is attached to the front face of the dash board and has a slot 30 to receive a bolt 31 which extends through horizontal arm 12 of the holder proper. A similar bracket 32 is attached to the dash board below bracket 28 and has a slot 33 to receive a bolt 34 that passes through arm 3, in order to securely fasten the holder proper to the vehicle.

In Fig. 9 of the drawings the brackets 28 and 32 are set on edge and secured to the side of the vehicle body, the bolts 31 and 34 in this use of the holder passing through perforations provided therefor in the arm 1.

In Fig. 10 the holder is depicted attached to a step ladder, in which use clips 35 are attached to arm 1 and are shaped to conformably engage with the opposite sides of one of the legs of the ladder, the clips being secured to the arm 1 by a bolt 36.

In Fig. 12 clamps 37 are secured to a short vertical arm 38 that is secured by bolt 39 to arm 1, the clamps engaging a side of the frame 40 of the vehicle top so as to support the holder on the outside of the top and at one side thereof.

In Fig. 13 the brackets 28 and 32 are attached to one end of the vehicle seat and are set on edge in a manner similar to the brackets shown in Fig. 9 of the drawings.

In Fig. 14 a right angular clip 41 is secured to the top bar 42 of the vehicle top and has a perforation 43 in its vertical part to receive a bolt 44 that also passes through the lower end of arm 1. The horizontal part of the clip has spaced side projections 45 which engage on opposite sides of arm 1 and serve to brace and rigidly hold same in position.

In Fig. 15 the clamps 37 engage the side 41 of the frame of the vehicle top, and also the short vertical arm 3 of arm 1, and in this use of the invention, the holder is located on the interior of the top.

As shown in the drawings, the lantern holder of itself comprises the arm 1, the horizontal bifurcated arm 12, the short horizontal arm 3, and the spring clips or jaws 8. This structure is variously attached by different forms of clamps, depending upon the use to which the lantern holder is put.

Having thus described my invention, I claim as new and desire to secure by Letters Patent:—

1. In a lantern holder, a vertical arm twisted adjacent one end thereof and bent outwardly at right angles to form a horizontal arm, the latter being provided with a concave portion to receive one arm of a lantern frame, said horizontal arm also having a slot which leads into the concave portion thereof and receives a seam on said lantern frame arm, and a pair of spring jaws secured on opposite sides of the vertical arm and formed with concave portions to receive said lantern frame arm.

2. In a lantern holder, a vertical arm composed of a strip of metal which has its ends bent at right angles, one of said ends being formed with a cut out portion to receive one arm of a lantern frame, the other end of said arm being forked and adapted to engage the horizontal base portion of said lantern frame arm, means carried by said vertical arm, between its ends to clamp the lantern frame arm thereto, and means to secure said vertical arm to a support.

3. In a lantern holder, a vertical reversible arm having its ends bent at right angles, one of said ends having a concave portion to receive a lantern frame arm, the other end of the arm being forked and in one position thereof being for securement to a support, and in another position being for engagement with the horizontal base portion of the lantern frame arm.

4. A lantern holder including a vertical arm formed of a strip of metal that has its ends bent at right angles, one of said ends being formed with a cut out portion to receive an arm of a lantern frame and being further formed with a slot that leads into the cut out portion to receive the seam of the lantern frame arm, means on the vertical arm between the ends thereof to clamp said lantern frame arm thereto, and means to secure the arm to a support.

5. A lantern holder including a vertical arm having its end portions twisted and bent outwardly at right angles and formed to engage one arm of a lantern frame, means on said vertical arm between its ends to secure the lantern frame arm thereto, and means to support the vertical arm.

6. In a lantern holder, a vertical arm having forked ends to engage one of the arms of a lantern frame, one of said ends in one position being for securement to a support, and spring jaws carried by the vertical arm between its ends to engage the lantern frame arm.

7. In a lantern holder, a vertical arm, means on the arm to engage and support a lantern, a projection formed on said arm at one end thereof, a bracket having a slot to receive said projection, and means connecting the arm and bracket to provide a pivotal connection therebetween to allow the arm to be moved about said means to withdraw the projection from said slot.

8. A lantern holder embodying a vertical arm having its ends extending at right angles, one of said ends being shaped to receive an arm of a lantern frame, and the other end being considerably longer than the first named end and having a forked part, to receive the base end of the lantern arm and means between said ends to engage the lantern arm.

In testimony whereof I have signed my name to this specification in the presence of two subscribing witnesses.

CHARLES AGUSTUS AIKEN.

Witnesses:
J. S. MUZZY,
J. S. ROBINSON.

Copies of this patent may be obtained for five cents each, by addressing the "Commissioner of Patents, Washington, D. C."